United States Patent [19]
Thomm et al.

[11] 3,846,507
[45] Nov. 5, 1974

[54] POLYAMIDE BLENDS WITH ONE POLYAMIDE CONTAINING PHTHALATE SULFONATE MOIETIES AND TERPHTHALATE ON ISOPHTHALATE RESIDUES

[75] Inventors: Ernest C. Thomm; Barry R. Knowlton, both of Arnprior, Ontario, Canada

[73] Assignee: Union Carbide Canada Limited, Toronto, Ontario, Canada

[22] Filed: Apr. 6, 1972

[21] Appl. No.: 241,838

[52] U.S. Cl. ......................... 260/857 TW, 260/78 R
[51] Int. Cl. ............................................. C08g 41/04
[58] Field of Search ............................. 260/857 TW

[56] References Cited
UNITED STATES PATENTS

| | | | |
|---|---|---|---|
| 3,039,990 | 6/1962 | Huffman | 260/857 TW |
| 3,184,436 | 5/1965 | Magat | 260/78 A |
| 3,389,549 | 6/1968 | David | 260/78 R |
| 3,514,498 | 5/1970 | Okazaki | 260/857 TW |
| 3,640,942 | 2/1972 | Crampsey | 260/857 TW |

Primary Examiner—Paul Lieberman

[57] ABSTRACT

A fibre forming polyamide having improved basic dye affinity and reduced acid dye affinity is described. A process for producing such polyamide is also described and consists of producing a polymer having certain benzene sulphonate units occurring in the polymer and then blending such polymer with normal polyamide to improve the dyeing characteristics thereof.

8 Claims, No Drawings

POLYAMIDE BLENDS WITH ONE POLYAMIDE CONTAINING PHTHALATE SULFONATE MOIETIES AND TERPHTHALATE ON ISOPHTHALATE RESIDUES

This invention relates to a process for producing fibre forming polyamides having improved basic dye affinity and to reduce the acid dye affinity thereof. More particularly, it relates to a process for producing fibre forming polyamides having certain benzene sulfonate units recurring in the polymer whereby the polymer can be blended with normal polyamides to improve the basic dye receptivity thereof and reduce the acid dye receptivity thereof.

It is disclosed in the prior art that certain polyamides having benzene sulfonate units can be prepared which have improved basic dye receptivity thereof.

It is disclosed in the prior art that certain polyamides having benzene sulfonate units can be prepared which have improved basic dye receptivity. For example, U.S. Pat. No. 3,039,990 of Huffman discloses the preparation of certain interpolyamides by reacting a first polyamide forming composition selected from (a) polymerizable monoaminomonocarboxylic acid and (b) dibasic carboxylic acid and a diamine with a second polyamide forming composition consisting of a sulfonated aromatic dicarboxylic acid compound and a diamine. Examples of such sulfonated aromatic compounds are sodium benzenedicarboxylic acid sulphonates. Such interpolymers were found to have improved basic dye receptivity. It was essential however according to the teachings of this patent that in order to achieve the desired dyeing properties a novel interpolymer had to be constructed. It was not possible according to the teachings of this patent that normal polyamide could be modified to improve its basic dyeing characteristics.

In accordance with the teachings of David in U.S. Pat. No. 3,389,549 polyamide having improved basic dye receptivity is obtained by producing a polymer having recurring units of certain benzenedicarboxylic acid sulphonates in the polymer. David considered it essential however that the number of amine gm. equivalents per $10^6$ grams of polymer not exceed 30 to avoid excessive acid dye staining. The applicants found that fibre forming polyamides having from 20 to 100 sulphonate gm. equivalents per $10^6$ grams of total polyamide and from 35 to 80 amine gm. equivalents per $10^6$ grams of total polyamide can give effective results. Furthermore the David patent does not teach that normal polyamide can be modified to improve its basic dye receptivity and reduce its acid dye receptivity by melt blending with the modified nylon of the reference.

In U.S. Pat. No. 3,184,436 of Magat, a fibre forming polyamide is prescribed having recurring units of certain benzenedicarboxylic acid sulphonates. The teaching of this reference is similar to that disclosed in the Huffman reference described above in that the improved dyeing characteristics can only be obtained by producing a modified polyamide. It is not disclosed in this reference that normal polyamide can be modified to alter its dyeing characteristics through melt blending once the polyamide is formed.

It is therefore an object of this invention to provide a process for producing fibre-forming polyamides having improved basic dye receptivity and reduced acid dye receptivity by blending and extruding certain polyamide intermediates with normal polyamides.

It is another object of this invention to produce certain novel fibre-forming polyamides having improved basic dye receptivity and reduced acid dye receptivity.

The applicants have found that by producing a novel fibre-forming polyamide consisting of a polyamide having from 10 mole percent to 50 mole percent based on the total recurring units of the polyamide, of recurring units of the structure:

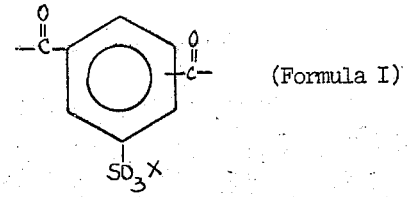

wherein X is Li, Na, K, or $NH_4$ and wherein the

groups are not ortho relative to each other blended with normal fibre-forming polyamide in an amount sufficient to provide a fibre-forming polyamide having from 20 to 100 sulphonate gm. equivalents per $10^6$ grams of total polyamide, said novel fibre-forming polyamide has improved basic dye receptivity and reduced acid dye receptivity.

The polyamide having from 10 to 50 mole percent of recurring units of the above mentioned structure Formula I which is called the polyamide intermediate in this application may be prepared in several ways. One method is to polymerize in the melt (A) a compound such as sodium 3,5-benzenedicarboxylic acid sulphonate with (B) isophthalic acid or terephthalic acid or their polyamide forming derivatives in an amount of from 1.0 mole to 9.0 moles per mole of compound (A), and (C) a diamine having from 2 to 10 carbon atoms such as hexamethylene diamine, in an amount equal to the mole equivalent of compound (A) plus compound (B).

An alternative method of preparing the polyamide intermediate is to polymerize in the melt (A) a compound such as sodium 3,5-benzenedicarboxylic acid sulphonate with (B) isophthalic acid or terephthalic acid or their polyamide forming derivatives and (C) a compound selected from monoaminomonocarboxylic acid, an aliphatic dicarboxylic acid having from 2 to 12 carbon atoms or a polyamide forming derivative of said aliphatic dicarboxylic acid, the amount of compound (B) plus (C) being from 1.0 mole to 9.0 moles per mole of compound (A), with at least 0.25 moles being compound (B), and (D) a diamine having from 2 to 12 carbon atoms such as hexamethylene diamine in an amount equal to the mole equivalent of compound (A) plus compound (B), and plus compound (C) when (C) is an aliphatic dicarboxylic acid or its polyamide forming derivative.

It has been found that isophthalic acid or terephthalic acid or their polyamide-forming derivatives are necessary to produce a polyamide intermediate which when blended with normal polyamide produces a polyamide having good fibre forming properties from a commercial point of view. While a polyamide intermediate of the above-mentioned compositions can be produced without isophthalic acid or terephthalic acid or their polyamide forming derivatives that has some fibre forming properties, such as being capable of producing "whiskers" when a molten sample is touched with a rod, such product is not capable of being extruded under normal process conditions to a commercially desirable product.

The polyamide intermediate is then blended and extruded with normal polyamide in a sufficient amount to produce a total polyamide blend having from 20 to 100 sulphonate gm. equivalents per $10^6$ grams of total polyamide. The blending can be carried out in a standard commercial mixer such as a Banbury and the molten blend subsequently extruded to form the fibre. The polyamide intermediate and the normal polyamide may be blended in the extruder itself by injecting the molten intermediate into the body of the extruder at a point wherein molten normal polyamide is being delivered through the extruder by the screw. By injecting at a point such as the transitional stage of a screw extruder, the intermediate and the normal polyamide can be thoroughly blended before the point of extrusion.

By the term "normal polyamide" is meant an unmodified polyamide which is known in the art, for example, nylon 6(polyepsilon caprolactam) or nylon 6/6 (polyhexamethylene adipamide).

EXAMPLE 1

226 gm. of epsilon-caprolactam and 116 gm. of hexamethylene diamine were melted in the presence of 25 gm. of water for two hours in a glass reactor equipped with a nitrogen purge, a stirrer and a reflux condenser. Then a quantity of 268 gm. of sodium 3,5-benzenedicarboxylic acid sulfonate was introduced to the reactor and the mixture was refluxed for 5 hours with continued nitrogen purging and stirring. The temperature of the reactor was gradually raised to 475°F to distill off water and the temperature was kept at 475°F for 4 hours. A viscous polymer resulted. After cooling the resulting polymer was broken up into small chips.

6 parts of the chips were blended with 100 parts of regular nylon 6 chips and the blend was melt-extruded under normal nylon 6 extrusion condition into 23-filament yarns. These yarns were very beady and uneven. Unmodified nylon 6 yarns were smooth.

EXAMPLE 2

116 gm. of isophthalic acid and 268 gm. of sodium 3,5-benzenedicarboxylic acid sulfonate were dispersed in 250 gm. of water in the reactor as in Example 1. 232 gm. of hexamethylene diamine in molten form was introduced in the reactor and the mixture was stirred for 30 minutes under nitrogen purge. Then 226 gm. of epsilon-caprolactam in molten form was introduced in the reactor. The total mixture was refluxed for 30 minutes. The temperature of the reactor was gradually raised to 515°F to strip off water and was kept at this value for 5.5 hours. A viscous polymer resulted. After cooling, the resulting polymer was broken up into small chips.

6 parts of these chips were blended with 100 parts of regular nylon 6 chips and the blend was melt-extruded under normal nylon 6 extrusion conditions into 23-filament yarns. These yarns were very smooth. They contain 69 gram equivalents of the sulphonate per $10^6$ grams of polymer. They were dyed for 45 minutes at boiling temperature with 0.5 wt. percent of the basic dyestuff C.I. basic red 17 in water solution buffered at a pH of 6.5. Very deep red colour on the yarns was obtained. Unmodified nylon 6 yarns dyed similarly with the basic dyestuff attained only a very light shade. When the modified yarns were dyed for 45 minutes at boiling temperature with 0.5 wt percent of the acid dyestuff C.I. acid blue 54 in water solution buffered at pH 6.5, only slight staining on the yarn was observed. When the unmodified yarns were simiarly dyed with the acid dyestuff, much heavier dye up-take was observed.

Chemical analysis of the modified and unmodified yarns showed the following:

|  | No. of end groups (gm. eq./$10^6$ gm. sample) Amino |
|---|---|
| Modified | 47 |
| Unmodified | 40 |

Even though there was an increase in amino end groups in the modified yarns, their acid dyeability was subdued.

EXAMPLE 3

116 gm. of isophthalic acid and 268 gm. of sodium 3,5-benzenedicarboxylic acid sulfonate were dispersed in 250 gm. of water in a stainless steel pressure reactor, equipped with a stirrer and a heater. 232 gm. of hexamethylene diamine in molten form was introduced in the reactor under a nitrogen blanket. After stirring for 30 minutes, 226 gm. of epsilon-caprolactam was introduced into the reactor. After sealing up the reactor, the temperature was gradually raised to and was kept at 400°F for 2 hours. The reactor pressure was approximately 50 psig at this temperature. After releasing the pressure slowly, the temperature was gradually raised to 515°F and was kept at this value for 3 hours. The resulting polymer was cooled and broken up into small chips.

Blends containing 2.5, 4.0 and 5.0 and 8.0 parts respectively per 100 parts of nylon 6 chips were melt-extruded under normal nylon 6 extrusion conditions into yarns. These yarns were found to be very smooth and were dyed to deep shades with the basic dyestuff C.I. basic red 17, but when dyed with the acid dyestuff C.I. acid blue 54, these yarns were stained only slightly. They contained 30, 46, 58 and 90 gram equivalents of sulphonate per $10^6$ grams of polymer respectively and contained 45, 48, 50 and 55 gram equivalents of amine groups per $10^6$ of polymer respectively.

EXAMPLE 4

Reactions employing different amounts of isophthalic acid were run as in Example 3. Yarns were obtained by melt-extruding 5 parts of the polymer chips and 100 parts of nylon 6 under normal nylon 6 extrusion conditions.

| Case | Components (gm.) | | | |
|---|---|---|---|---|
| | Sodium 3,5-benzenedicarboxylic acid sulfonate | isophthalic acid | hexamethylene diamine | epsilon-caprolactam |
| 1 | 268 | 166 | 232 | 226 |
| 2 | 268 | 124 | 185 | 180 |
| 3 | 268 | 83 | 174 | 170 |

They all dyed to a deep shade with the basic dyestuff C.I. basic red 17.

EXAMPLE 5

A reaction similar to that of Example 3 was run using the following components:

| Component | Weight (gm.) |
| --- | --- |
| Sodium 3,5-benzenedicarboxylic acid sulfonate | 402 |
| terephthalic acid | 249 |
| hexamethylene diamine | 348 |
| epsilon-caprolactam | 336 |

4.5 parts of the resulting polymer and 100 parts of nylon 6 chips were melt-extruded under normal nylon 6 extrusion conditions into yarns which were dyed to a very deep shade with the basic dyestuff C.I. basic red 17 and stained only lightly with the acid dyestuff C.I. acid blue 54. The total polymer contained 53 gram equivalents of sulphonate per $10^6$ grams of polymer and 49 gram equivalents of amine groups per $10^6$ grams of polymer.

EXAMPLE 6

4.5 parts of the polymer chips of Example 3 and 100 parts of nylon 6/6 chips were melt-extruded under normal nylon 6/6 extrusion conditions into 23-filament yarns. These yarns were dyed to a deep shade with the basic dyestuff C.I. basic red 17 and stained only lightly with the acid dyestuff C.I. acid blue 54.

EXAMPLE 7

A reaction similar to that of Example 3 was run using 40 times the amount of components.

4.5 parts of the resulting polymer and 100 parts of nylon 6 chips were melt-extruded under normal nylon 6 extrusion conditions into 23-filament yarns. These yarns were found to be very smooth and were dyed to a deep shade with the basic dyestuff C.I. basic red 17 and stained only lightly with the acid dyestuff C.I. acid blue 54.

We claim:
1. A process for producing a fibre forming polyamide having improved basic dye receptivity and reduced acid dye receptivity, which process comprises:
A. melt polymerizing
   1. a compound of the formula:

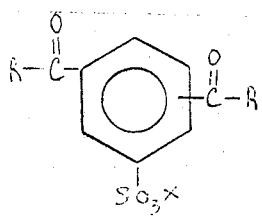

wherein R is OH, Cl, OCH₃ or OC₂H₅ and X is Li, Na, K or NH₄ and wherein the $$-\overset{O}{\underset{\|}{C}}-R$$

groups are not ortho relative to each other, with
2. components selected from the group consisting of (a) and (b) wherein components (a) are
   a. (i) a compound selected from the group consisting of isophthalic acid and terephthalic acid and their polyamide-forming derivatives in an amount of from 1.0 mole to 9.0 moles per mole of compound (1), and
   a. (ii) a diamine having from 2 to 12 carbon atoms in an amount equal to the mole equivalent of compound (1) plus compound (a)(i); and components (b) are
   b. (i) a compound selected from the group consisting of isophthalic acid and terephthalic acid and their polyamide-forming derivatives, and
   b. (ii) a compound selected from the group consisting of a monoaminomonocarboxylic acid having from 2 to 12 carbon atoms, a lactam of said monoaminomonocarboxyic acid, an aliphatic dicarboxylic acid having from 2 to 12 carbon atoms and a polyamide-forming derivative of said aliphatic dicarboxylic acid, the amount of compound (b)(i) plus the amount of compound (b)(ii) being from 1.0 mole to 9.0 moles per mole of compound (1) with at least 0.25 moles being of compound (b)(i), and
   b. (iii) a diamine having from 2 to 12 carbon atoms, in an amount equal to the mole equivalent of compound (1) plus compound (b)(i), and plus compound (b)(ii) when (b)(ii) is an aliphatic dicarboxylic acid or its polyamide forming derivative to produce a polyamide intermediate having from 10 mole percent to 50 mole percent of sulphonate units based on the recurring units of the polymer, and
B. blending and melt-extruding said polyamide intermediate with from 5 to 95 percent by weight of the blend of normal fibre-forming polyamide in an amount sufficient to produce a fibre-forming polyamide having from 20 to 100 sulphonate gm. equivalents per $10^6$ grams of total polyamide and from 35 to 80 amine gm. equivalents per $10^6$ grams of total polyamide.

2. A process for producing a fibre forming polyamide having improved basic dye receptivity and reduced acid dye receptivity, which process comprises:
A. melt polymerizing
   1. a compound of the formula:

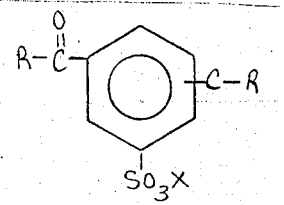

wherein R is OH, Cl, OCH₃ or OC₂H₅ and X is Li, Na, K or NH₄ and wherein the

groups are not ortho relative to each other, with a dicarboxylic acid compound selected from the group consisting of isophthalic acid and terephthalic acid in an amount of from 1.0 mole to 9.0 moles per mole of compound (1) and hexamethylene diamine in an amount equal to the mole equivalent of compound (1) plus said dicarboxylic acid compound to produce a polyamide intermediate having from 10 mole percent to 50 mole percent of sulphonate units based on the total recurring units of the polymer, and B. blending and melt-extruding said polyamide intermediate with from 5 to 95 percent by weight of the blend of normal fibre-forming polyamide in an amount sufficient to produce a fibre-forming polyamide having from 20 to 100 sulphonate gm. equivalents per $10^6$ grams of total polyamide and from 35 to 80 amine gm. equivalents per $10^6$ grams of total polyamide.

3. A process as claimed in claim 2 wherein R in the formula is OH and X is Na or K.

4. A process as claimed in claim 2 wherein said fibre-forming polyamide has from 30 to 80 sulphonate gm. equivalents per $10^6$ grams of total polyamide and from 35 to 70 amine gm. equivalents per $10^6$ grams of total polyamide.

5. A process for producing a fibre-forming polyamide having improved basic dye receptivity and reduced acid dye receptivity, which process comprises:

A. melt polymerizing
   1. a compound of the formula:

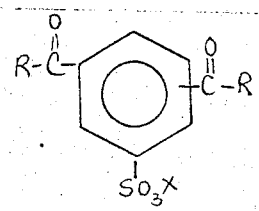

wherein R is OH, Cl, $OCH_3$ or $OC_2H_5$ and X is Li, Na, K or $NH_4$ and wherein the

groups are not ortho relative to each other, with 2. a compound selected from the group consisting of isophthalic acid and terephthalic acid and their polyamideforming derivatives, and 3. a compound selected from the group consisting of a monoaminomonocarboxylic acid having from 2 to 12 carbon atoms, a lactam of said monoaminomonocarboxylic acid and an aliphatic dicarboxylic acid having from 2 to 12 carbon atoms, and a polyamide forming derivative of said aliphatic dicarboxylic acid, the amount of compound (2) plus the amount of compound (3) being from 1.0 mole to 9.0 moles per mole of compound (1), with at least 0.25 moles being of compound (2), and hexamethylene diamine in an amount equal to the mole equivalent of compound (1) plus compound (2), and plus compound (3) when compound (3) is an aliphatic dicarboxylic acid or its polyamide forming derivative, to produce a polyamide intermediate having from 10 mole percent to 50 mole percent of sulphonate units based on the recurring units of the polymer, and B. blending and melt-extruding said polyamide intermediate with from 5 to 95 percent by weight of the blend of normal fibre-forming polyamide in an amount sufficient to produce a fibre-forming polyamide having from 20 to 100 sulphonate gm. equivalents per $10^6$ grams of total polyamide and from 35 to 80 amine gm. equivalents per $10^6$ grams of total polyamide.

6. A process as claimed in claim 5 wherein R in said formula is OH and X is Na, K or Li.

7. A process as claimed in claim 6 wherein said lactam compound is epsilon-caprolactam.

8. A process as claimed in claim 7 wherein said fibre-forming polyamide has from 30 to 80 sulphonate gm. equivalents per $10^6$ grams of total polyamide and from 35 to 70 amine gm. equivalents per $10^6$ grams of total polyamide.

* * * * *